July 27, 1954

A. J. KWAKE 2,684,994

GROUND CLAMP FOR ELECTRICAL OUTLET BOXES AND THE LIKE

Filed May 31, 1950

INVENTOR.
ANDREW J. KWAKE
BY Ashworth Martin
his ATTORNEY.

Patented July 27, 1954

2,684,994

UNITED STATES PATENT OFFICE 2,684,994

GROUND CLAMP FOR ELECTRICAL OUTLET BOXES AND THE LIKE

Andrew J. Kwake, New Kensington, Pa.

Application May 31, 1950, Serial No. 165,177

3 Claims. (Cl. 174—51)

My invention relates to ground clamps, and more particularly to clamps for securely holding the incoming ends of cables in connecting boxes such as outlet boxes and switch boxes and for grounding the ground wires of the cables to the box.

In connecting cables or conduits to the interior walls of an outlet box or the like, it is somewhat difficult to accurately and positively connect the ground wires to the box in a manner to insure accurate grounding of any current that flows in the ground wire. Usually, the ground wires are wrapped once or twice around the grounding screw, but frequently they become loosened or even disengaged.

My invention has for its object the provision of a clamping and holding device in the form of a clip which will not only connect the conduits to the interior walls of a connecting box, but will also firmly and adequately connect the ground wires thereto, simply through the use of a single screw that is utilized to connect the holding clip for the cables and the ground wires to the box wall.

Figure 1:
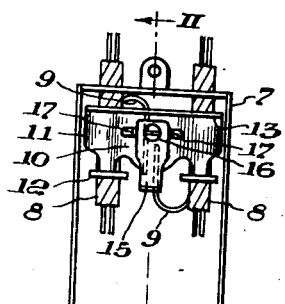
Figure 2:
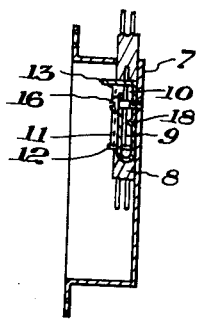
Figure 3:
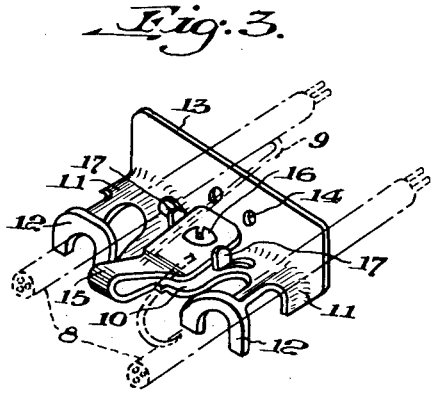
Figure 6:
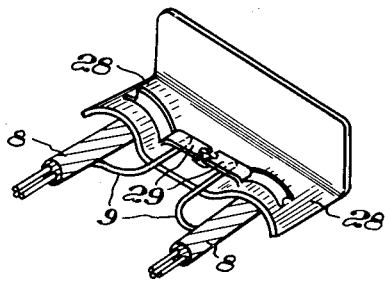
Figure 4:
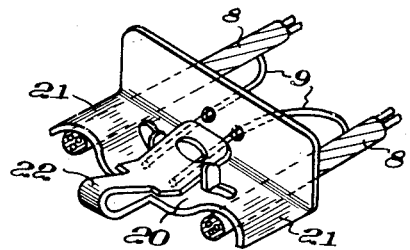
Figure 5:
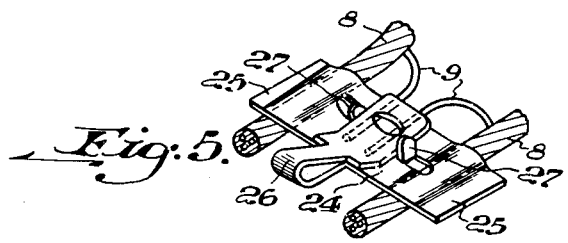

Some of the forms which my invention may take are shown in the accompanying drawing, wherein Figure 1 is a face view of an outlet box or the like with the cover plate removed, equipped with my invention; Fig. 2 is a view taken on the line II—II of Fig. 1; Fig. 3 is a perspective view, on an enlarged scale of the attaching clip of Figs. 1 and 2; Fig. 4 is a modification of the structure of Fig. 3, and Figs. 5 and 6 show still other modified forms of the attaching clip.

Referring first to Figs. 1 to 3, an outlet box or switch box 7 may be of any well known conventional form. The lead-in cables or conduits are indicated by the numeral 8 and the ground wires by the numeral 9. The clip which is employed for attaching the conductors to the box is shown at 10. The clip has wing portions 11 which carry yokes 12. The members 11 and 12 serve as clamping devices for holding the cables 8 in place.

The clip has an outstanding flange 13 at its inner end, and this flange is provided with holes 14 through one of which rearwardly-bent ground wires 9 extend, to lie beneath a tongue 15, together with the other ground wire. Through this tongue, an attaching screw 16 extends and has threaded engagement with the wall of the box 7, to not only securely hold the cables 8 in place, but to hold the tongue 15 snugly against the ground wires and the ground wires against the body of the clip. Lips 17 are struck up from the body of the clip to assist in aligning the bent back ends of the ground wires when placing them, and also to prevent them from slipping from beneath the tongue 15. The tongue and the body portion of the clip are shown as notched and offset at 18 to kink the wires slightly and thus hold them more firmly.

The clip can conveniently be made of a single piece of sheet metal, and it is therefore not only simple and cheap of manufacture, but a single attaching and clamping screw is all that is required to connect the cables and the ground wires to the switch box.

Referring now to Fig. 4, I show a structure that is somewhat simpler than that of Figs. 1 to 3. In this case, the clip 20 has curved wings 21 for partly embracing the cables and holding them in position. The tongue 22 functions in the same manner as the tongue 15, to hold the ground wires 9 firmly in place.

Fig. 5 shows the clip 24 in its simplest form, since the body portion thereof is not provided with an outstanding flange as in the other figures and simply has curved recesses in the rear faces of its wings 25, to hold the cables, and the tongue 26 and lips 27 for holding the ground wires in place.

The clip 28 of Fig. 6 shows tongues 29 struck outwardly from the body portion thereof, and bent inwardly for engagement by an attaching screw such as 16 which will hold them tightly against the ground wires and hold the cables clamped between the clip and the wall of a box such as 7.

I claim as my invention:

1. The combination with an electrical connecting box having lead-in openings for conductors that have ground wires, comprising a clip having cable-clamping wings positioned to engage laterally-spaced cables in the box, and a flexible tongue projecting from one end of the clip and bent back into overlying relation to the mid portion thereof and between the wings, the tongue and the mid portion having axially-alined holes to receive an attaching screw that has threaded engagement with a hole in that box wall to which the clip is applied when clamping cables against the wall, and the tongue being of sufficient width to clamp the ground wires against the said mid portion of the clip when the screw is applied.

2. The combination with an electrical connecting box having lead-in openings for conductors that have ground wires, comprising a clip having cable-clamping wings positioned to engage laterally-spaced cables in the box, a flexible tongue projecting from one end of the clip and bent back into overlying relation to the mid portion thereof and between the wings, the tongue and the mid portion having axially-alined holes to receive an attaching screw that has threaded engagement with a hole in that box wall to which the clip is applied when clamping cables against the wall, the tongue being of sufficient width to clamp the ground wires against the said mid portion of the clip when the screw is applied, and there being lips struck up from the said mid portion, to retain the ground wires in place adjacent to the sides of the screw.

3. The combination with an electrical connecting box having lead-in openings for conductors that have ground wires, of a one-piece clip having cable clamping wings positioned to engage laterally-spaced cables in the box, and a flexible tongue carried by the mid portion of the clip and bent into overlying relation to the mid portion of the clip, at the zone between the wings, the tongue and the mid portion having axially aligned holes to receive an attaching screw that has threaded engagement with a hole in that wall of the box to which the clip is applied when clamping cables against said wall, and the tongue being of sufficient width to clamp ground wires against the said mid portion of the clip when the screw is applied.

References Cited in the file of this patent

UNITED STATES PATENTS

| Number | Name | Date |
| --- | --- | --- |
| Re. 18,773 | Thomas | Mar. 21, 1933 |
| 1,542,074 | Mayer | June 16, 1925 |
| 1,611,499 | Vaughn et al. | Dec. 21, 1926 |
| 1,880,081 | Frederickson | Sept. 27, 1932 |
| 1,914,635 | Goetzelman | June 20, 1933 |

OTHER REFERENCES

Bulletin G-9, Nov. 1, 1928 (page 4), 174-51 (cat.), Crouse-Hinds Co., Syracuse, N. Y. (Copy in Div. 65.)